US006220795B1

United States Patent
Matthews

(10) Patent No.: US 6,220,795 B1
(45) Date of Patent: Apr. 24, 2001

(54) SPOTTING DRILL AND MILLING CUTTER

(75) Inventor: Blease M. Matthews, Milton, VT (US)

(73) Assignee: Vermont Indexable Tooling, Inc., Milton, VT (US)

(*) Notice: Subject to any disclaimer, the term of this patent is extended or adjusted under 35 U.S.C. 154(b) by 0 days.

(21) Appl. No.: 09/286,375

(22) Filed: Apr. 5, 1999

(51) Int. Cl.$^7$ .................................................. B23B 51/00
(52) U.S. Cl. ........................ 408/1 R; 407/42; 407/113; 408/224; 408/233; 408/713
(58) Field of Search ................. 407/35, 40, 42, 407/54, 65, 113, 114; 408/59, 223, 224, 233, 713

(56) References Cited

U.S. PATENT DOCUMENTS

| | | | |
|---|---|---|---|
| 2,575,239 | 11/1951 | Stephens | 255/61 |
| 3,878,905 | 4/1975 | Schaumann | 175/383 |
| 4,060,335 | 11/1977 | Holloway et al. | 408/233 |
| 4,072,438 | * 2/1978 | Powers | 408/59 |
| 4,115,024 | 9/1978 | Süssmuth | 407/114 |
| 4,302,135 | * 11/1981 | Lillie | 408/59 |
| 4,338,050 | 7/1982 | Ozer et al. | 408/1 R |
| 4,355,932 | 10/1982 | Koppelmann et al. | 408/188 |
| 4,642,001 | * 2/1987 | Gill et al. | 408/59 |
| 4,844,669 | * 7/1989 | Tsujimura et al. | 408/188 |
| 4,859,123 | 8/1989 | Koesashi et al. | 408/233 |
| 4,927,303 | * 5/1990 | Tsujimura et al. | 408/223 |
| 5,259,707 | 11/1993 | Keller | 408/233 |
| 5,340,246 | 8/1994 | Tukala | 408/233 |
| 5,474,407 | 12/1995 | Rödel et al. | 408/227 |
| 5,758,997 | 6/1998 | Mealey et al. | 408/224 |
| 5,839,857 | * 11/1998 | Paya | 407/114 |
| 5,893,683 | * 4/1999 | Johnson | 407/42 |
| 5,951,214 | * 9/1999 | Rothballer et al. | 407/114 |
| 5,957,755 | * 9/1999 | LaFlamme | 407/113 |
| 5,971,676 | * 10/1999 | Kojima | 408/231 |
| 6,039,515 | * 3/2000 | Lamberg | 408/188 |

FOREIGN PATENT DOCUMENTS

0677825 * 8/1979 (SU) ........................................ 408/59

OTHER PUBLICATIONS

Product Information Sheet entitled "Ingersoll Indexable Spotting Drill—Series FAK", date: at least as early as Apr. 24, 2000.
VIT's 90° Indexable Carbide Centering Drill, vol. 1, Issue 1, Nov. 20, 1996.
Indexable Carbide Spot Drill & Countersink Tools Brochure, undated.

* cited by examiner

Primary Examiner—Steven C. Bishop
(74) Attorney, Agent, or Firm—Downs Rachlin & Martin, PLLC

(57) ABSTRACT

A spotting drill and milling cutter (10) having a shank (30) and a pocket (50) for receiving an insert (52). The cutter is capable of forming a spotting hole (12) having a concentric circular cavity (16) at the bottom of the spotting hole. Insert (52) includes a primary cutting edge (54), a secondary cutting edge (64) and a tertiary edge (68) having a cutting portion (68a). The primary cutting edge terminates at a point (56) which is radially offset about 0.001" to 0.100" with respect to rotation axis (36) of the cutter. Primary radial relief surface (76) associated with the primary cutting edge and secondary radial relief surface (78) associated with the secondary cutting edge are provided to reduce back dragging relative to the primary and secondary cutting edges.

26 Claims, 4 Drawing Sheets

_US 6,220,795 B1_

SPOTTING DRILL AND MILLING CUTTER

FIELD OF THE INVENTION

The present invention pertains to combined spotting (or centering) drills and milling cutters.

BACKGROUND OF THE INVENTION

Spotting and centering drills with indexable replaceable inserts are used to form spotting and centering holes in a workpiece. These holes provide an accurate center position for twist, spade or other drills used to drill a straight, deep bore in the workpiece. One such drill is described in U.S. Pat. No. 5,259,707 to Keller ("the '707 patent"). The cutting insert of the tool described in the '707 patent features a V-shaped cutting edge. The two sides of the cutting blade are symmetrical, with the apex of the "V" disposed coaxial with the axis of rotation of the drill. This design is problematic because at the center of rotation no cutting forces are applied. Instead, workpiece material at the axis of rotation is pressed aside by the point of the insert, which increases cutting forces and temperature of the tool, decreases tool life and, in some cases, decreases feed rates.

Indexable drills featuring a shank and multiple cutting inserts, with the point of the insert being radially offset from the rotational axis, are known in the art. Such a drill is described in U.S. Pat. No. 5,758,997 to Mealey et al. ("the '997 patent"). FIG. 9 of the '997 patent suggests it is known to radially offset the point of a cutting insert relative to the rotational centerline of the tool. The cutting tool of the '997 patent is principally intended to drill holes, typically using a spotting hole for a guide. Because of the use of even numbers of inserts to balance drilling forces, and the relatively shallow cutting angles of the inserts of the drill of the '997, it is apparent the drill is not designed to form spotting or centering holes.

SUMMARY OF THE INVENTION

One aspect of the present invention is a spotting drill and milling cutter comprising a shank having an insert pocket and a rotational axis, and an insert mounted in the pocket. The insert has a primary cutting edge and a secondary cutting edge, with the primary cutting edge having a point that is radially offset with respect to the rotational axis. The insert further includes a primary radial relief surface associated with the primary cutting edge.

Another aspect of the present invention is an insert for a spotting drill and milling cutter having a shank with an insert pocket for receiving the insert and a rotational axis. The insert comprises a primary cutting edge having a point that is radially offset with respect to the rotational axis when said insert is received in the insert pocket and a secondary cutting edge. The insert further includes a primary radial relief surface associated with the primary cutting edge.

Yet another aspect of the present invention is a method of forming a spotting hole in a workpiece. The method is accomplished using a rotary cutter having a rotational axis, a primary cutting edge, a secondary cutting edge and a tertiary edge. The primary cutting edge terminates at a point that is radially offset 0.001" to 0.1 00" with respect to the rotational axis and the tertiary edge has a cutting portion extending between the point and the rotational axis. The method involves causing relative rotation between the workpiece and the rotary cutter and then causing relative feed between the rotary cutter and the workpiece so that the point first contacts the workpiece, and then the primary cutting edge and the cutting portion of the tertiary edge contact the workpiece and remove material from the workpiece so as to form a circular cavity. Next, relative feed between the rotary cutter and the workpiece is effected so as to cause the secondary cutting edge to engage the workpiece and remove material from the workpiece so as to form a spotting hole concentric with the circular cavity.

DETAILED DESCRIPTION OF THE INVENTION

Figure 1:
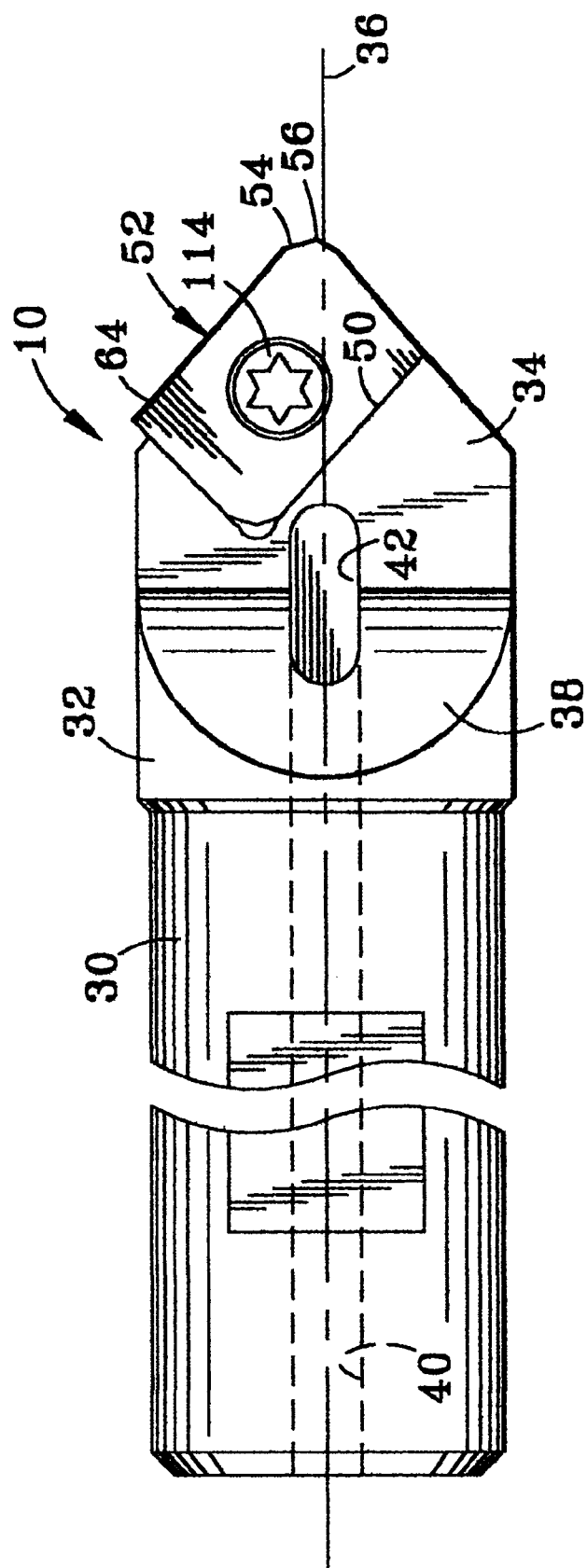
FIG. 1 is a top elevation view of the spotting drill and milling cutter of the present invention, with the shank being shown in broken view to facilitate illustration.
Figure 2:
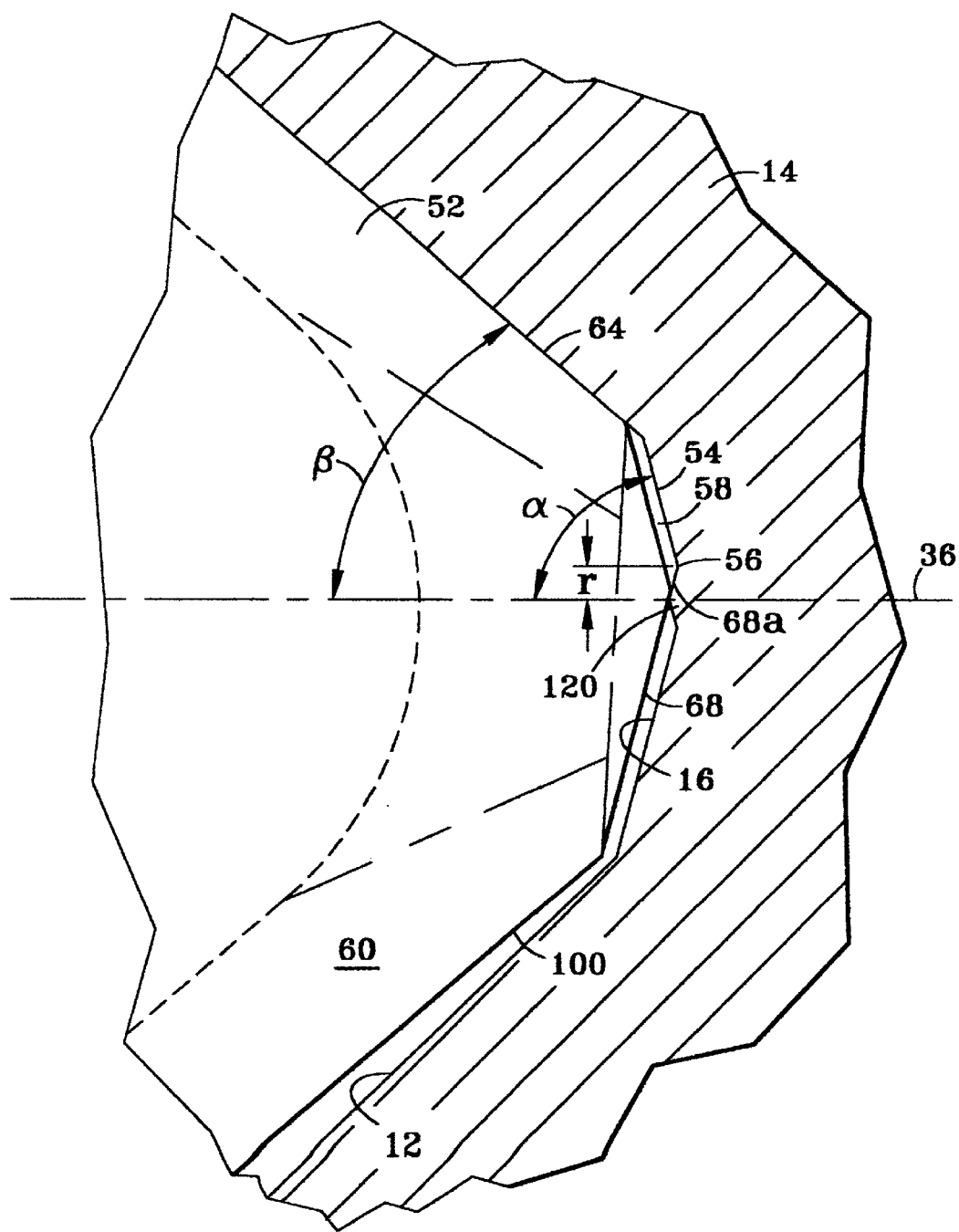
FIG. 2 is a cross-section view of a workpiece in which a spotting hole has been formed using the tool illustrated in FIG. 1, with the cutting insert being illustrated in top elevation view.

Referring to FIGS. 1 and 2, the present invention is a spotting drill and milling cutter 10 designed to provide a spotting hole 12 in a workpiece 14. As those skilled in the art will appreciate, spotting hole 12 may also be considered to be a centering hole, and so use of the term "spotting" herein also encompasses the term "centering." As is known in the art, spotting holes are used to guide and ensure proper placement of twist drills and other cutting tools used to form bores that are coaxial relative to the spotting hole. In addition, cutter 10 is designed so that portions of spotting hole 12 remaining after a bore is formed in workpiece 14 using the spotting hole may also serve as a chamfer or countersink in which the head of a fastener, e.g., a screw or rivet, is seated. Spotting hole 12 also includes an inner circular cavity 16 that is coextensive with the remainder of the spotting hole.

Figure 3:
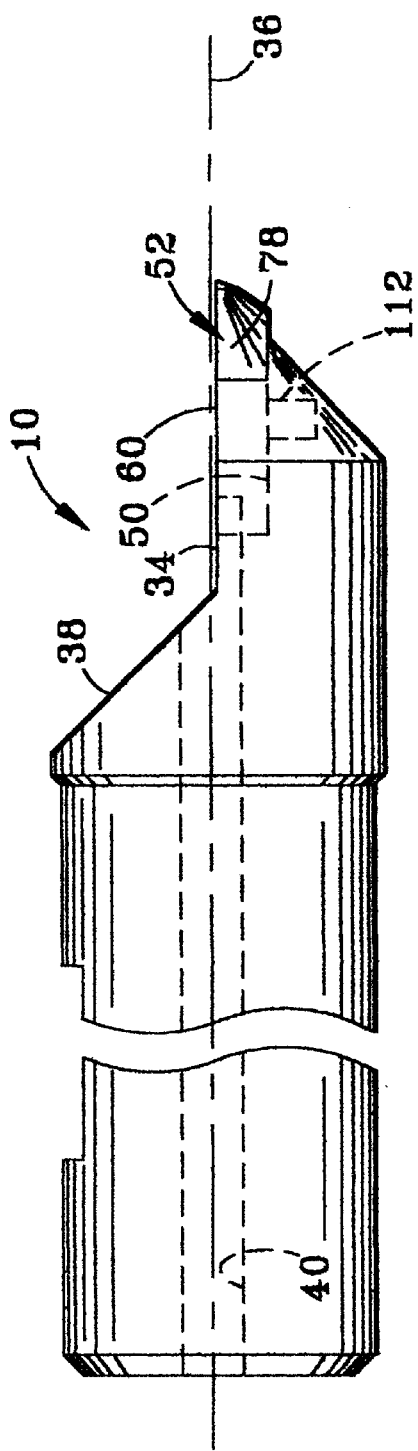
FIG. 3 is a side elevation view of the tool illustrated in FIG. 1, with the tool being rotated 90° about its rotational axis with respect to the view of FIG. 1.

Turning now to FIGS. 1–3, cutter 10 includes a shank 30 and a front portion 32 attached to the shank. Front portion 32 includes a land 34 positioned at, or slightly below (as viewed in FIG. 3), rotational axis 36 of cutter 10. Front portion 32 also includes a transition surface 38 connecting land 34 with the outside diameter surface of the front portion. Optionally, a coolant bore 40 may be provided in cutter 10 extending through shank 30 and front portion 32, with the bore terminating at aperture 42 adjacent the region where transition surface 38 intersects land 34.

Cutter 10 includes an insert pocket 50 formed in land 34 at the leading end of the cutter. Insert pocket 50 is sized and positioned to receive and support cutting insert 52 in predetermined relation to rotational axis 36, as described in more detail below. Insert 52 is preferably made from high speed steel, carbide, cemented carbide or other materials known to those skilled in the art. The specific material used will vary as a consequence of desired feed rates, material characteristics of workpiece 14, and other factors.

With reference to FIGS. 2 and 4–7, insert 52 includes a primary cutting edge 54 (FIG. 2) that terminates at point 56 which, when the insert is received in pocket 50, is radially offset with respect to rotational axis 36 (on the same side as the primary cutting edge) by an amount r that varies from about 0.001" to 0.100", preferably about 0.005" to 0.020". The extent of radial offset will vary as a function of the material for workpiece 14, feed rates, diameter of spotting hole 12 and other factors. The placement of pocket 50 in front portion 32 is selected, along with the placement of point 56, on insert 52 to achieve the desired radial offset of the point. Primary cutting edge 54 subtends an angle α(FIG. 2) with rotational axis 36 that ranges from 55° to 73°, preferably 65° to 70°. Angle α is selected as a function of the material for workpiece 14, feed rates, diameter of spotting hole 12, diameter of the bore to be formed using the spotting hole and other factors.

Preferably, but not necessarily, primary cutting edge 54 is dressed so as to provide a small edge preparation surface 58 (FIG. 2) extending parallel to the primary cutting edge. The width, as measured along an axis extending perpendicular to primary cutting edge 54 and parallel to top surface 60, of edge preparation surface 58, and the configuration of the edge preparation surface, will vary as a function of desired application. However, a width of about 0.001" to 0.010" is preferred. The configuration of edge preparation surface 58 may be planar and angled relative to surface 60, or may have one of various concave or convex configurations known in the art. In this regard, edge preparation surface 58 may be configured to serve as a "chip breaker," where a concave configuration is provided so as to cause strips of metal removed by insert 52 to break into small chips. A typical angle for edge preparation surface 58 is a negative angle of about 20°. While not illustrated, secondary cutting edge 64 preferably has an associated edge preparation surface having a similar configuration to that of edge preparation surface 58. Insert 52 further includes a secondary cutting edge 64 (FIG. 2) that is continuous with primary cutting edge 54 and extends radially outwardly from the primary cutting edge. Secondary cutting edge 64 subtends an angle β (FIG. 2) with rotational axis 36 that ranges from 30° to 73°, preferably 40° to 55°. Angle β is selected as a function of the material for workpiece 14, feed rates, diameter of spotting hole 12, and the desired configuration of cavity 16.

Insert 52 additionally includes a tertiary edge 68 extending radially inwardly from point 56 toward and then past rotational axis 36. As described below in connection with the description of the operation of tool 10, cutting portion 68a of edge 68 cuts material from workpiece 14, with the remainder of edge 68 not participating in the cutting operation.

Figure 5:
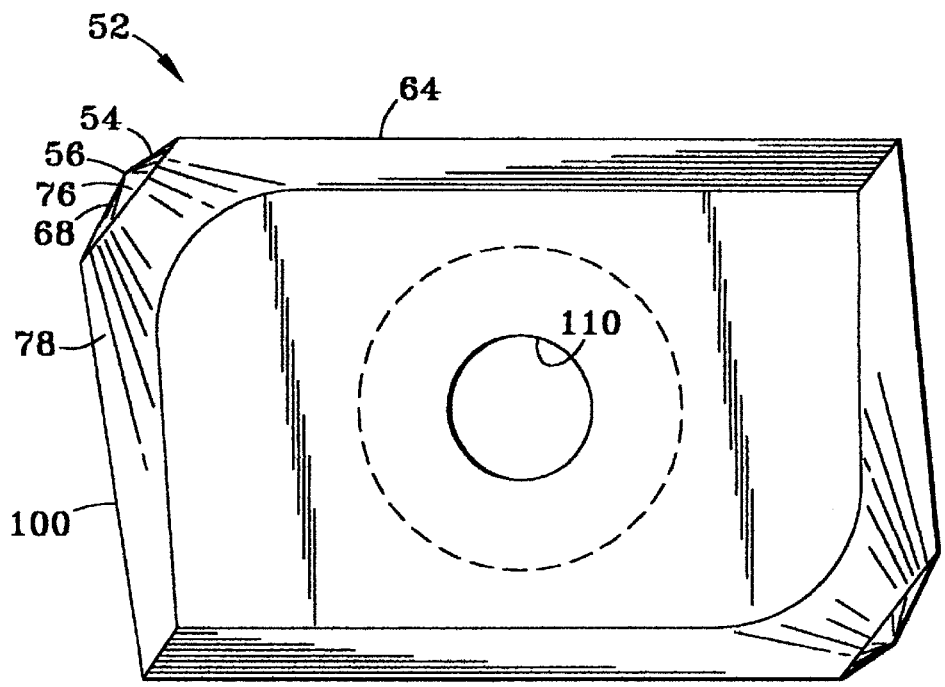
FIG. 5 is a view of the bottom of the cutting insert.
Figure 6:
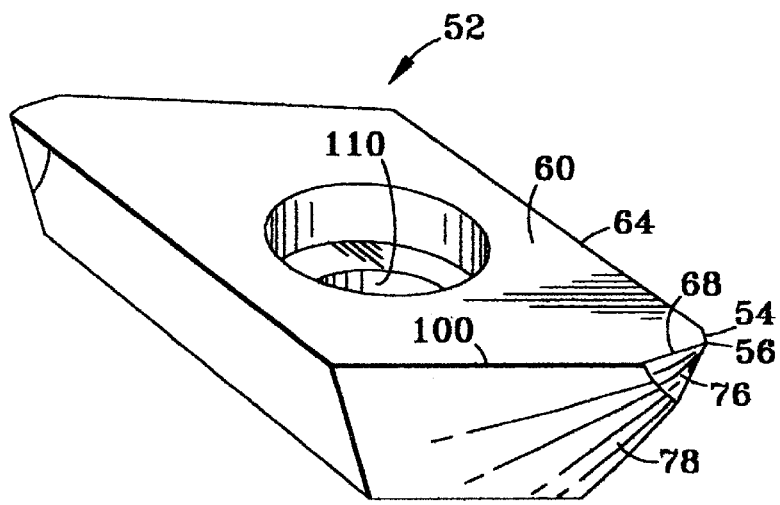
FIG. 6 is a perspective view of the insert.
Figure 7:
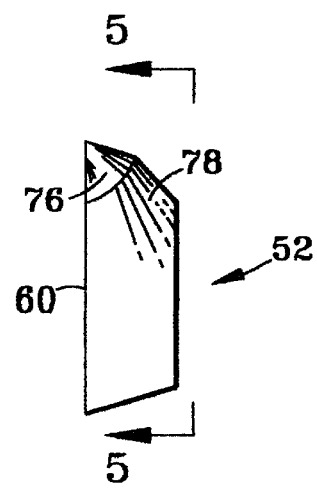
FIG. 7 is a front elevation view showing the primary and secondary cutting edges of the cutting insert of FIG. 4, and the primary and secondary radial relief surfaces associated, respectively, with the primary and secondary cutting edges.

Turning now to FIGS. 5–7, to avoid back dragging adjacent primary cutting edge 54, insert 52 includes a primary radial relief surface 76. The latter commences at primary cutting edge 54 and trails the primary cutting edge, as determined in the direction of rotation of cutter 10. Radial relief surface 76 may have an eccentric or non-eccentric configuration, as desired. Preferably, radial relief surface 76 is characterized by drop of about 0.001" to 0.030", preferably about 0.012" to 0.018", as measured with a conventional machine tool indicator (not shown) starting at primary cutting edge 54, and extending through a 180° arc about rotational axis 36. This measurement is performed with the stem (not shown) of the indicator initially held perpendicular to primary cutting edge 54 and then retained in this position relative to rotational axis 36 while rotating cutter 10 180° about the rotational axis in the rotational direction used in actual cutting. Alternatively, cutter 10 may be held fixed and the indicator rotated about axis 36 as described. In any event, the extent of radial relief is selected so as to balance the somewhat competing parameters of minimizing back dragging while maintaining a sufficiently strong cutting edge.

Insert 52 preferably includes a secondary radial relief surface 78 associated with secondary cutting edge 64. Secondary radial relief surface 78 commences at or adjacent secondary cutting edge 64 and trails the secondary cutting edge, as determined in the direction of rotation of cutter 10. Secondary radial relief surface 78 also may have an eccentric or noneccentric configuration, and also preferably has a drop of about 0.001" to 0.030", preferably about 0.012" to 0.018", as measured with a conventional machine tool indicator (not shown) starting at secondary cutting edge 64, and extending through a 180° arc about rotational axis 36. The placement of the indicator stem is as described above with respect to primary relief surface 76.

Figure 4:
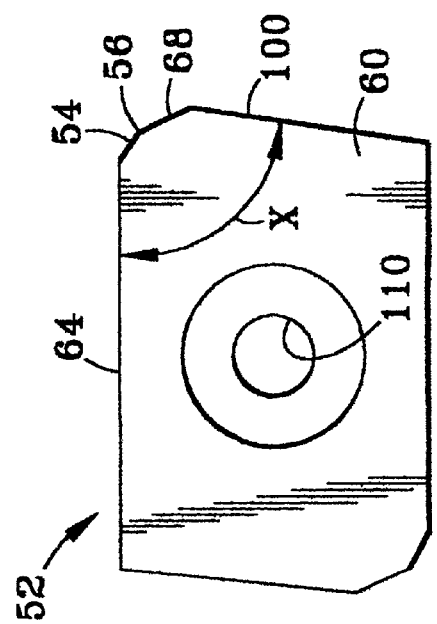
FIG. 4 is a view of the top of the cutting insert of the tool shown in FIG. 1 that is exposed when the insert is secured in the shank.

With reference to FIG. 4, insert 52 also includes trailing edge 100. Because trailing edge 100 does not participate in the cutting of workpiece 14, it forms an included angle X with secondary cutting edge 64 of less than 90°, preferably about 80°.

Referring to FIGS. 1 and 2, to facilitate insertion and removal of insert 52 in pocket 50, a countersunk bore 110 is provided in the insert. Front portion 32 includes a threaded bore 112 communicating with pocket 50. Bore 112 is sized and positioned to threadably receive a retainer screw 114 positioned in bore 110, whereby insert 52 may be securely, but releasably, mounted in pocket 50.

As illustrated in FIGS. 1–7, insert 52 preferably, but not necessarily, includes the above-described cutting edges, radial relief surfaces and other features at diagonally opposite corners. This permits insert 52 to be used twice before sharpening. When the primary cutting edge 54 and secondary cutting edge 64 at one corner require sharpening, retainer screw 114 is removed, insert 52 is removed from pocket 50 and rotated 180°, and then the insert is repositioned in the pocket and secured with the retainer screw.

Cutter 10 may be sized to create a circular cavity 16 having a diameter ranging from 0.050" to 1.5", with the depth of cut also influencing the diameter of the circular cavity, as discussed in more detail below in connection with the discussion of operation of cutter 10. For smaller diameter circular cavities 16, the diameter of shank 30 and size of insert 52 are reduced, and for larger diameter circular cavities, the diameter of shank 30 and the size of insert 52 are increased. As those skilled in the art will appreciate, precise dimensional parameters for these elements of cutter 10 will be selected based on intended size of circular cavity 16.

Similarly, the length of primary cutting edge 54 is selected based on the desired diameter of spotting hole 12. Typically, primary cutting edge 54 will have a length ranging from 0.0001" to 0.100", typically about 0.050".

Referring to FIGS. 1–7, in operation cutter 10 is installed in a tool holder of a milling machine, machining center or other known machine tool (not shown), is caused to rotate and then is moved into contact with workpiece 14. Alternatively, cutter 10 may be held fixed, and workpiece 14 may be rotated relative to the cutter and moved toward the cutter. In either case, point 56 first engages workpiece 14, immediately followed by the portion of primary cutting edge 54 immediately adjacent the point, with the result that the primary cutting edge begins to cut the workpiece so as to form circular cavity 16. Simultaneously, cutting portion 68a of tertiary edge 68 begins to cut workpiece 14 with the result that nipple 120 begins to form in the center of circular cavity 16. Thus, the radial offset of point 56 results in material removal adjacent rotational axis 36 by trepanning. Until the full length of primary cutting edge 54 engages workpiece 14, the diameter of circular cavity 16 is determined as a function of the depth of feed of cutter 10 relative to the workpiece.

As cutter 10 is fed toward workpiece 14, the entire length of cutting edge 54 and portion 68a will finally engage the workpiece, causing an increase in the cutting action. Further feeding of cutter 10 toward workpiece 14 causes secondary cutting edge 64 to engage and cut workpiece 14 so as to form remaining portions of spotting hole 12. When the latter is intended to function as a countersink, angle β is selected as a function of the angle of the undersurface of the head of the fastener (not shown) that will ultimately be received in spotting hole 12. The diameter of spotting hole 12 will also be determined as a function of the depth of feed of cutter 10 relative to workpiece 14 up until the point secondary cutting edge 64 is fully engaged with the workpiece. If desired, a coolant such as air or known cutting fluids may be delivered through coolant bore 40 and aperture 42 so as to provide cooling action to insert 52 and front portion 32 of cutter 10. Provision of such coolant also aids in the evacuation of chips produced by the cutting action of cutter 10.

Point 56 is radially offset relative to rotational axis 36 to improve cutting action. In particular, this radial offset improves the cutting action of cutter 10 because both primary cutting edge 54 and portion 68a of tertiary cutting edge 68 cut material from workpiece 14. By comparison, known spotting drills or cutters that include a point that is coincident with the rotational axis of the cutter, such as the one described in U.S. Pat. No. 5,259,707, referenced above, do not actually cut material at and immediately adjacent the rotational axis. Instead, such material is believe to be extruded or otherwise forced away from the rotational axis. This is a less efficient approach to forming a spotting hole in a workpiece, and so can adversely impact feed rates, power requirements, tool longevity and other factors. The formation of nipple 120, while not necessarily desired, is of minimal negative consequence because of its small size relative to the above-described advantages obtained by offsetting point 56 radially with respect to rotational axis 36.

Cutting action is further enhanced by the primary radial relief surface 54 and the secondary radial relief surface 64. These surfaces are designed to prevent the back dragging of insert 52 behind primary cutting edge 54 and secondary cutting edge 64, which could significantly reduce cutting speeds and decrease tool longevity. While it is preferred that both primary radial relief surface 54 and secondary radial relief surface 64 be provided, in some cases it may be possible to omit the secondary radial relief surface.

Since certain changes may be made in the device and method of using the device described above without departing from the scope of the present invention, it is intended that all matter contained in the above description or shown in the accompanying drawings shall be interpreted in an illustrative and not in a limiting sense.

What is claimed is:

1. A spotting drill and milling cutter comprising:
   a. a shank having an insert pocket and a rotational axis; and
   b. an insert mounted in said pocket, said insert having a primary cutting edge and a secondary cutting edge, said primary cutting edge having a point that is radially offset with respect to said rotational axis, said insert further including a primary radial relief surface associated with said primary cutting edge.

2. A spotting drill and milling cutter according to claim 1, further wherein said primary and secondary cutting edges are continuous.

3. A spotting drill and milling cutter according to claim 1, wherein said primary and secondary cutting edges are both positioned on one side of said rotational axis.

4. A spotting drill and milling cutter according to claim 1, wherein said primary cutting edges subtends an angle with said rotational axis ranging from 55° to 73°.

5. A spotting drill and milling cutter according to claim 4, wherein said angle ranges from 65° to 70°.

6. A spotting drill and milling cutter according to claim 1, wherein said secondary cutting edge subtends an angle with said rotational axis that ranges from 30° to 73°

7. A spotting drill and milling cutter according to claim 6, wherein said angle ranges from 40° to 55°.

8. A spotting drill and milling cutter according to claim 1, wherein said primary radial relief surface has a drop of about 0.001" to 0.030", as measured beginning at said primary cutting edge, extending around said rotational axis and ending at a location 180° removed from said primary cutting edge.

9. A spotting drill and milling cutter according to claim 8, wherein said drop is about 0.012" to 0.018".

10. A spotting drill and milling cutter according to claim 1, further including a secondary radial relief surface associated with said secondary cutting edge.

11. A spotting drill and milling cutter according to claim 10, wherein said secondary radial relief surface has a drop of about 0.001" to 0.030", as measured beginning at said secondary cutting edge, extending around said rotational axis and ending at a location 180° removed from said secondary cutting edge.

12. A spotting drill and milling cutter according to claim 11, wherein said drop is about 0.012" to 0.018".

13. A spotting drill and milling cutter according to claim 1, further including an edge preparation surface adjacent said primary cutting edge and said secondary cutting edge.

14. A spotting drill and milling cutter according to claim 13, wherein said edge preparation surface is configured to function as a chip breaker.

15. A spotting drill and milling cutter according to claim 1, wherein said radial offset ranges from 0.001" to 0.100".

16. A spotting drill and milling cutter according to claim 15, wherein said radial offset ranges from 0.005" to 0.020".

17. A spotting drill and milling cutter according to claim 1, wherein said shank and insert are sized so as to permit formation of a spotting hole having a diameter ranging from about 0.050" to 1.5".

18. A spotting drill and milling cutter according to claim 1, further wherein said insert includes a tertiary edge having a cutting portion extending between said point and said rotational axis.

19. An insert for a spotting drill and milling cutter having a shank with an insert pocket for receiving the insert and a rotational axis, the insert comprising:
   a. a primary cutting edge, said primary cutting edge having a point that is radially offset with respect to said rotational axis when said insert is received in the insert pocket;
   b. a secondary cutting edge; and
   c. a primary radial relief surface associated with said primary cutting edge.

20. An insert according to claim 19, wherein said primary cutting edge subtends an angle with said rotational axis ranging from 55° to 73°.

21. An insert according to claim 19, further including a secondary cutting edge, wherein said secondary cutting edge subtends an angle with said rotational axis that ranges from 30° to 73°.

22. An insert according to claim 19, wherein said primary radial relief surface has a drop of about 0.001" to 0.030", as measured beginning at said primary cutting edge, extending around said rotational axis and ending at a location 180° removed from said primary cutting edge.

23. An insert according to claim 19, further including a secondary radial relief surface associated with said secondary cutting edge, wherein said secondary radial relief surface has a drop of about 0.001" to 0.030", as measured beginning at said secondary cutting edge, extending around said rotational axis and ending at a location 180° removed from said secondary cutting edge.

24. An insert according to claim 19, wherein said radial offset ranges from 0.001" to 0.100".

25. An insert according to claim 19, wherein said primary and secondary cutting edges are continuous.

26. A method of forming a spotting hole in a workpiece comprising the steps of:

a. providing a rotary cutter having a rotational axis, a primary cutting edge, a secondary cutting edge and a tertiary edge, wherein said primary cutting edge terminates at a point that is radially offset 0.001" to 0.100" with respect to said rotational axis and said tertiary edge has a cutting portion extending between said point and said rotational axis;

b. causing relative rotation between the workpiece and said rotary cutter;

c. causing relative feed between said rotary cutter and the workpiece so that said point first contacts the workpiece and then said primary cutting edge and said cutting portion of said tertiary edge contact the workpiece and remove material from the workpiece so as to form a circular cavity; and d. causing further relative feed between said rotary cutter and the workpiece so as to cause said secondary cutting edge to engage the workpiece and remove material from the workpiece so as to form a spotting hole concentric with said circular cavity.

* * * * *